Patented Aug. 31, 1937

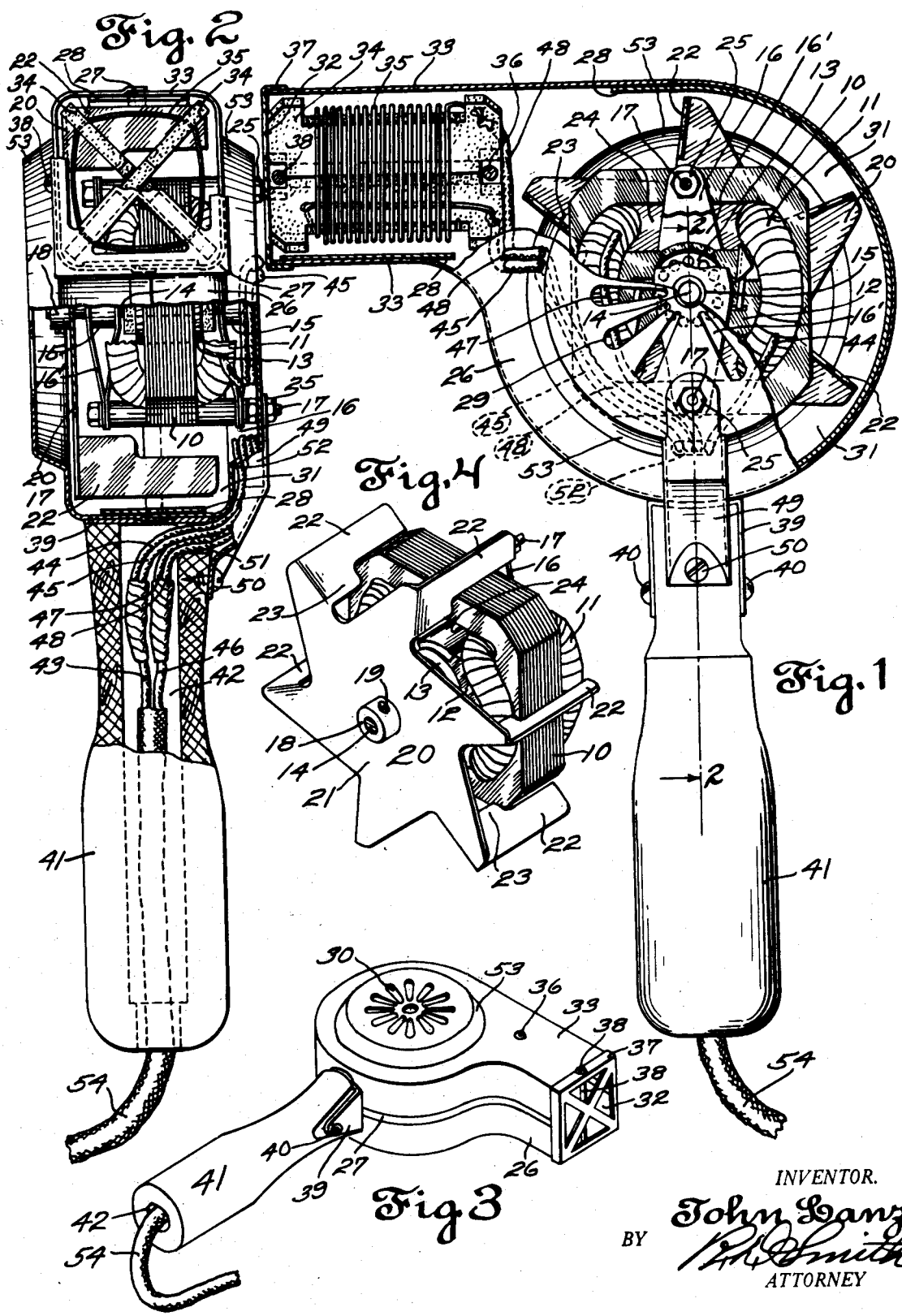

2,091,510

UNITED STATES PATENT OFFICE 2,091,510

MOTOR COOLING FAN AND BLOWER

John Lanz, New Haven, Conn., assignor to The A. C. Gilbert Company, New Haven, Conn., a corporation of Maryland Application February 2, 1935, Serial No. 4,683

18 Claims. (Cl. 172—36)

This invention relates to means for motivating air in surface contact with the stator of small electric motors to assist in cooling of the stator or for utilizing the heat generated therein.

The invention also relates to the employment of such means in the drawing in or blowing out of air by any useful appliance wherein cooling of the motor or transfer of the heat generated therein to a different point, is desirable.

More particularly, the present improvements relate to portable blowers such as hair dryers whose size and structure may be compacted and whose efficiency and ease of handling may be improved by use of an electric motor equipped with such air motivating means.

An object of these improvements is to equip the rotor of a motor with fan blades carried to revolve around and in close proximity to the electro magnetic parts of a motor stator in which heat is generated by operation of the motor.

Another object is to so mount such blades that one side of the motor stator may be attached to a frame or casing at points which are out of the path of movement of the revolving blades.

Another object is partially to baffle the approach of in-drawn air at one side of the motor stator to increase the volume of air which is indrawn from the other side of the motor stator, thereby to increase the flow of air in an axial direction through whatever spaces there may be in the stator body closer to the rotor and to the electric windings than is the exterior surface of the stator.

Another object is to displace a given volume of air with a lower rotative speed of the motor, thereby to eliminate noise and other objectionable results of high speed operation. The larger diameter of the path in which blades may revolve, if arranged according to these improvements, permits a given air displacement to be accomplished with a given motor at less than half the rotative speed heretofore considered necessary.

Another object is to provide means whereby the rotor may carry or propel the blades with a minimum increase of the overall dimension of the motor unit in an axial direction.

Another object is to form the blades and their carrying means from a single sheet of metal.

Another object is to arrange a housing for a motor equipped with air propelling blades arranged as described so that the air propelled thereby shall be constrained in part to a circuitous path surrounding the stator of the motor except for a designed outlet from such path which may be provided by a blower nozzle.

Another object is to align in substantially common planes, the motor, the air propelling blades, the blower nozzle, and a support handle for all of them thereby to provide a portable blower appliance whose weight shall be distributed in substantial symmetry with respect to such handle.

Another object is to mount an air warming electric heating unit in operative association with the blower nozzle or other air outlet and to augment the air heating effect thereof by the addition thereto of such heat as is fanned away from the motor stator by the novelly arranged air propelling blades of these improvements.

The foregoing and other objects which will appear from the following description may be attained by a variety of details of construction and arrangement, an example of which is illustrated in the accompanying drawing, wherein:—

Fig. 1 is a view in side elevation showing a portable hair dryer incorporating the present improvements with its casing wall partially broken away to expose the interior parts.

Fig. 2 is a view looking from the left at Fig. 1 showing part of the casing and handle of the appliance broken away on the section line 2—2 in Fig. 1.

Fig. 3 is a perspective view showing the exterior of the hair dryer on a reduced scale as viewed from the side thereof opposite that shown in Fig. 1.

Fig. 4 is a perspective view showing the electric motor and fan blades of Figs. 1 and 2 removed from the casing of the appliance.

10 indicates the body, usually laminated, of any electric motor stator having the coils of field winding 11 and presenting the poles 12 to the rotor 13 whose shaft 14 may turn in suitable bearings 15 supported by brackets 16, 16' mounted upon studs 17 rigid with the stator body 10.

At the left end of shaft 14 a hub 18 is carried and fixed by the set screw 19. Hub 18 fixedly carries the air propeller 20 which may be of varied forms and constructions but is here shown to comprise a star shaped disc portion 21 bent to provide six equally spaced axially extending fins 22 overreaching the stator body 10 to serve as air propelling blades revolving in close proximity to the exterior edges of the laminated stator body. A portion 23 of each blade is seen to be of increased width where room is afforded adjacent the propeller side of the stator body thereby to augment the displacement of air in this region outwardly from the vicinity of the rotor.

The motor and fan unit, just described, and as pictured alone in Fig. 4, develops to have a highly efficient cooling effect upon the stator body of the motor partly because of the linear speed of the air propelling blades 22 revolving at so large a radius in such close proximity to the metal of the stator, and partly because the air drawn in and displaced by the blades is somewhat baffled by the disc portion 21 in attempts to approach the stator from the left of Fig. 4 resulting in a greater proportion of the air displaced by blades 22 being drawn through the spaces 24 adjacent the poles 11 of the motor which condition increases and concentrates the flow of air in contact with all surfaces of the stator body in comparison with the characteristics of air flow which would otherwise result. Hence there is imparted to and picked up by the flowing air displaced by blades 22, a maximum portion of all heat generated in the motor body by its electromagnetic operation.

The ability of air to enter through both side walls of the housing, referring to apertures 29 in one side wall, and apertures 30 in the opposite wall, and the further condition that the disc 21 is so shaped that its solid area does not extend to so large a diameter as the path of travel of blades 22, enables the flow of air which enters through apertures 30 and which has not been heated by contact with the stator surfaces to join and mix with the flow of stator heated air which is drawn in through apertures 29 whereby the temperature of the combined indrawn streams of air in the path of the fan blades 22 will tend to be lowered and keep the metal of the casing comfortably cool.

Referring to Figs. 1 and 2 the studs 17 at the opposite side of the stator body 10 from the propeller 20 are shown to be fixedly secured by nuts 25 to the wall of a blower casing 26. Obviously the motor might be rigidly mounted in any other suitable way, its entire side at the right of Fig. 2 being clear of the path of travel of the propeller blades 22. The casing 26 may be centrally split and overlappingly or otherwise joined at 27, suitably shaped metallic strips 28 serving to overlap and strengthen the interior of the joint if desired.

Figs. 1 and 3 indicate the provision of decorative, radially disposed apertures 29 and 30 in respectively opposite walls of the casing through which air may be sucked by the action of the propeller 20 whose blades 22 may be one or more in number and are shown in Fig. 1 to revolve in a circuitous channel 31 formed by, and comprising, the annular space between the exterior edges of the stator body 10 and the radially outermost circular portion of the casing wall. The air thus circulated in the channel 31, and which as before described is in substantial part drawn in through the stator spaces 24, is blown out through a tangentially disposed blower orifice 32 formed by a nozzle portion 33 of the casing 26.

The exhaust passage for air defined by nozzle 33 would, if projected in a straight line inwardly, include in such imaginary extension of the passageway a substantial portion of the stator body and its field windings and would fall approximately tangential not to the periphery of the stator, but to the periphery of the rotor. Thus the stream of air discharging at high velocity and in a straight line of flow toward the discharge nozzle 33 sweeps more fully past and in contact with the surfaces of the stator and its windings with consequent maximum cooling effect thereupon.

The action of the combined streams of air flowing around the outer surfaces of the stator body 10 is rendered turbulent by the fact that the stator body is straight sided and rectangular in shape which causes the chamfered corners of the stator body to project farther into the path of the air traveling in channel 31 than do the straight sides of the stator body. Thus the cross-sectional area of the channel through which the air is impelled by blades 22 is a variable at different points and the impelled air is forced into impact with the more projecting portions of the stator body and more thoroughly absorbs and dissipates heat from the surfaces thereof than would be the case if the outer edge of the stator body were substantially circular or cylindrical.

As it is desirable to heat the out-blown air for some purposes to a higher temperature than can be derived merely from the heat generated in the motor body, a suitable air heating unit may be carried within the nozzle 33, which in the form shown is comprised of a spider 34 made of suitable refractory material on which is helically wound electrical resistance wire 35, the same being insulated or spaced from all metallic parts other than its current supplying conductors.

The spider 34 of the heater unit may be retained at its right end in Fig. 1 by the through bolt 36 spanning the walls of the casing 26 and at the orifice end of the nozzle 33 by a decorative cap 37 retained by screws 38 or similar bolt and perforated to permit free passage of the outblown air.

At the bottom of casing 26 a bracket member 39 of inverted U shape may be spot-welded or otherwise secured to the casing wall or to one of the split portions thereof in a manner not to interfere with the separation of the two portions of the casing, and held rigidly to this bracket by screws 40 is the handle 41 of wood or other suitable material containing lengthwise thereof the bore 42 to receive and contain an electric supply cord 54 with its connections to the motor and to the heating unit of the appliance.

Figs. 1 and 2 indicate that one of the electric supply wires 43 of cord 54 within handle 41 is tapped into two branches, the branch wire 44 connecting to the motor winding 11 and the branch wire 45 connecting to one end of the heater unit resistance 35. The other supply wire 46 of cord 54 is likewise tapped into two branches of which the wire 47 connects to the motor winding 11 and the wire 48 connects to the other end of heater resistance 35. Figs. 1 and 2 also indicate a decorative guard 49 secured to the outside of handle 41 by screw 50 and retained beneath the nut 25 and having side flanges bent into edgewise contacting relation with the contour of casing 26 and handle 41 thereby to enclose and conceal the wires 44, 45, 47 and 48 between their points of leaving the handle 41 through aperture 51 and their points of entering the casing 26 through aperture 52. The side wall of wire guard 49 is falsely shown as in part broken away in Fig. 2 to better illustrate its construction. To avoid interference with the propeller blades 22, wires 45 and 48 may at their portion shown in Fig. 1 extend for a short distance to the exterior of the casing 26.

Each of the separable parts of casing 26 is shown to be provided with an outwardly dished circular formation 53 which makes more room for the various connecting wires, in preference to increasing the overall width of the casing throughout to accommodate them therewithin. It will be understood that an important accomplishment is to provide in a portable appliance, such as a hair dryer, an effective air-heating and air-blowing arrangement of motor-driven blades in a housing space of the thinnest possible dimension in relation to a given size of motor. By the present improvements the overall width of this space need exceed but little, if at all, the diameter of an appliance handle of ordinary size for convenient grasping by the hand of the user.
A further important accomplishment resides in the ability by these improvements to blow a given volume of air properly heated for hair-drying or other purposes, by means of a motor running at say 3,000 revolutions per minute rather than at the much greater speeds of from 7,000 to 9,000 revolutions per minute which have commonly been resorted to heretofore. The resulting quietness of operation and elimination of vibration and wear are very important assets to a portable blower appliance, and are made possible by the principles of construction and arrangement exemplified herein.

Without intent, therefore, to limit the invention to the particular construction and arrangement disclosed, I claim:

1. The combination with a motor including an intersticed stator body and a rotor in part surrounded thereby, of a fan blade motivated by said rotor and disposed to revolve around the stator body, a housing for said motor shaped to define an annular space surrounding the stator, said housing having air inlet apertures on both sides of the motor to admit respectively separate streams of air therethrough, and a disc carried by said rotor and having portions of its edge substantially spaced from the nearest parts of the housing thereby completely to separate said streams of air in the immediate vicinity of said rotor while permitting said streams to meet and co-mingle in the path of travel of said fan blade.

2. The combination with a motor including an intersticed stator body and a rotor in part surrounded thereby, of an air impeller comprising a hub portion constructed as a disc-like wheel of solid section throughout a circular area approximately as large as the overall size of the stator body and carried by said rotor at one side of the stator body and carrying a fan blade disposed to revolve around the stator body, and a housing enclosing said motor and the path of travel of said blade and provided with an air inlet on the side of the stator most remote from said hub portion of the impeller.

3. The combination with a motor including an intersticed stator body and a rotor in part surrounded thereby, of an air impeller comprising a metal disc carried by said rotor and having a solid circular section approximately as large as the overall size of the stator body carried by said rotor adjacent one side of the stator body and carrying projecting blades integral with the metal of said disc extending in an axial direction and overlapping the outside edge of the stator body for impelling air around the same, and a housing enclosing said motor and the path of travel of said blade and provided with an air inlet on the side of the stator body most remote from said disc.

4. The combination with a motor including an intersticed stator body and a rotor in part surrounded thereby, of a fan blade carried by said rotor and disposed to revolve around said stator body, a casing enclosing said motor and the path of travel for said fan blade and having apertures to admit separate streams of air respectively from opposite sides of the motor to the central space in said casing surrounded by said path of blade travel, a baffle at one side of the stator body having a portion of its outer edge spaced substantially from the nearest parts of said casing and disposed to deflect one of said streams of air before it reaches the stator body while in no way interfering with the flow of the other stream of air toward and through the interstices in the stator body, whereby only one of said streams of air is warmed by contact with the surfaces of the stator body before it is deflected by said baffle.

5. The combination defined in claim 4 in which said baffle has a solid section confined to a circular area of smaller diameter than the path of travel of said fan blade thereby to permit the said separate streams of air to meet and mix within the path of travel of said fan blade for assisting to maintain a low temperature within the casing.

6. The combination with a motor including a rotor, and a stator body, of a rotary fan for cooling said motor comprising an air impeller constructed from a single continuous piece of material shaped and disposed to form a mounting disc portion supported at its central point by said rotor in proximity to one side of the stator body and to form a plurality of blades extending parallel to the axis of the rotor across and in edgewise relation to the outer edge of the stator body.

7. The combination defined in claim 6 in which the said blades are inclined relative to a true diametrical plane passing through the rotor axis and in a direction to impart centrifugal force to the air impelled thereby.

8. The combination with a motor including a rotor and a stator body, of an air impeller for cooling the motor comprising a star shaped plate supported at its central portion by said rotor in proximity to one side of the stator body and having each of its star-like projections prolonged at an angle to its path of travel to form an air impelling blade extending parallel to the axis of the rotor and across the outer edge of the stator body, said plate and projections comprising portions of a single continuous piece of sheet metal.

9. The combination defined in claim 8 in which the said air impelling blades are of one width in their portions which overlap the outer edge of the stator body and are of a greater width in their portions between the stator body and the star shaped plate.

10. The combination with a motor including an intersticed stator body and a rotor in part surrounded thereby, of a housing comprised of separably con-joined shells combining to form a piston-shaped chamber containing said motor having an elongated straight discharge passage and having its width augmented by outwardly cupped recesses having flat walls containing air openings and flanking each side of the stator body respectively, a fan blade carried by said rotor and disposed to revolve around the stator body thereby to pump separate streams of air inwardly through the said recess walls respectively, and means to separate said streams of air within said housing and disposed to deflect and direct said streams of air toward the path of travel of said fan blade and there to permit said streams to join and commingle, said discharge passage of the chamber being disposed in tangential relation to the periphery of said rotor and aligned with a substantial portion of the stator body.

11. The combination defined in claim 10 in which the said housing is constructed to form an annular passage extending around said stator body and communicating with the said straight outlet passage to permit discharge of air from the said annular passage through said outlet passage.

12. The combination with a motor including an intersticed stator body and a rotor in part surrounded thereby, of an air impeller for pumping streams of air from respectively different source locations comprising a disc portion carried by said rotor at one side of the stator body and a fan blade carried by said disc portion in position to revolve around said stator body, and a housing enclosing said motor and the path of travel of said blade and substantially spaced from parts of the peripheral edge of said disc portion, said housing being provided with an air inlet on each side of the stator body whereby one of said streams of air is drawn toward one side of the stator body through one of said inlets by the action of said fan blade and is caused to travel through the interstices of the stator body uninterrupted by the said disc portion but is then deflected in its direction of flow by said disc portion before meeting and commingling with the other stream of air.

13. In an encased electric motor designed to be held in the hand of the user, in combination, a motor stator, a fan blade for impelling air to cool said stator and mounted to revolve around the same in common planes therewith, a casing having a lateral opening for electric lead wires and shaped to closely encompass said stator and blade, a hollow handle joined at one end to said casing and having a lateral opening for electric lead wires, attachment cord lead wires extending lengthwise through said hollow handle, out of the said lateral opening therein and into the said lateral opening in said casing, and a detachably mounted channel strip having side wall edges conformed to and abutting against the outside surfaces of said casing and handle and positioned to cover and protect said lead wires between the said lateral openings.

14. The method of cooling a motor stator intersticed with air passages and surrounding the motor armature, which consists in pumping a stream of ambient air toward the stator taken from the vicinity of one end of the armature, simultaneously pumping another stream of ambient air toward the stator taken from the vicinity of the other end of the armature, deflecting the first said stream of air away from the armature axis and toward the outermost reaches of the stator before the air contacts with the stator, deflecting the other said stream of air away from the armature axis and toward the outermost reaches of the stator after the air of the last said stream has passed through said stator passages, and then causing both streams of air to meet and mix in heat exchange relation to the outermost reaches of the stator before the mixed air of said streams is discharged from the vicinity of the stator.

15. The method of effecting a modified heat exchange between a supply of ambient air and electrically heated parts of an electric motor, which comprises the steps of simultaneously pumping two separate streams of ambient air into a single chamber containing said motor parts, preventing the immediate jointure of said streams of air when they first enter said chamber, isolating one of said streams of air from heat exchange relation to said motor parts after it has entered said chamber, simultaneously directing the other stream of air directly into heat exchange relationship with said motor parts, later mixing the isolated stream of air with the other stream of air in heat exchange relationship to said motor parts, and then discharging the mixed air of said streams away from the vicinity of said motor parts at a higher temperature than the ambient air.

16. The combination with an electric motor having an intersticed stator body and a rotor in part surrounded thereby, of a housing containing said motor shaped in part to define an annular space surrounding the stator body and the rotor axis and having opposed walls perforated in central portions smaller in compass than said annular space, a fan blade motivated by said rotor in said annular space and operative to pump separate streams of air in respectively different directions through the perforated housing walls and toward said annular space, and a baffle disposed crosswise the rotor axis of insufficient areal extent to partition the housing interior with air tightness but solid in sufficient area completely to separate said streams of air during their simultaneous travel within said housing toward said annular space.

17. The combination with an electric motor having an intersticed stator body and a rotor in part surrounded thereby, of a housing containing said motor and shaped in part to define an annular space surrounding the stator body and the rotor axis and having opposed walls perforated in central portions smaller in compass than said annular space, an air impeller unit carried by said rotor including a fan blade disposed to revolve in said annular space thereby to pump separate streams of air in respectively different directions into said housing through the perforated walls thereof and toward said annular space and also including a disc-like baffle disposed crosswise the axis of the rotor and having an areal extent insufficient to form an air sealing partition across the housing interior, said baffle having a solid portion operative to completely separate said streams of air within said housing during their simultaneous travel toward said annular space.

18. In a motor cooling double stream air pump, in combination with an electric motor having a rotor, a casing enclosing a chamber containing said motor and having perforate walls for the intake to said chamber of respectively separate streams of air near respectively opposite axial ends of said rotor, and shaped to provide an annular heat exchange space surrounding the motor, a baffle disposed to only partly partition the interior of said chamber in a plane intermediate and spaced from one axial side of the motor and the contiguous casing wall, and a fan blade mounted to revolve in said annular chamber in a path confined to the motor side of said baffle whereby a stream of air is indrawn through the casing wall near one axial end of the rotor and into cooling contact with the lateral surfaces of the motor and another stream of air is indrawn through the other casing wall near the opposite axial end of the rotor and deflected from immediate contact with said motor by said baffle and into a direction to join and mix with the first said stream of air in said annular space.

JOHN LANZ.

CERTIFICATE OF CORRECTION.

Patent No. 2,091,510.   August 31, 1937.

JOHN LANZ.

It is hereby certified that error appears in the printed specification of the above numbered patent requiring correction as follows: Page 3, second column, line 59, claim 10, for the hyphenated word "piston-shaped" read pistol-shaped; and that the said Letters Patent should be read with this correction therein that the same may conform to the record of the case in the Patent Office.

Signed and sealed this 12th day of October, A. D. 1937.

(Seal)

Henry Van Arsdale.
Acting Commissioner of Patents.